US006351493B1

(12) United States Patent
Reed et al.

(10) Patent No.: US 6,351,493 B1
(45) Date of Patent: Feb. 26, 2002

(54) CODING AN INTRA-FRAME UPON DETECTING A SCENE CHANGE IN A VIDEO SEQUENCE

(75) Inventors: Eric Reed, Cambridge; Frederic Dufaux, Chestnut Hill, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/107,769

(22) Filed: Jun. 30, 1998

(51) Int. Cl.[7] .............................................. H04N 7/12
(52) U.S. Cl. .................................. 375/240.13; 348/700
(58) Field of Search ....................... 375/240.13, 240.16, 375/240.24; 348/420.1, 416.1, 700, 699; 382/236, 238, 239

(56) References Cited

U.S. PATENT DOCUMENTS

| | | | | |
|---|---|---|---|---|
| 5,267,334 A | * | 11/1993 | Normille et al. ............ | 382/236 |
| 5,602,594 A | * | 2/1997 | Cho et al. .................... | 348/419 |
| 5,724,100 A | | 3/1998 | Kuchibhotla ................ | 348/700 |
| 5,825,425 A | * | 10/1998 | Kazui et al. ................. | 348/420 |
| 5,856,848 A | * | 1/1999 | Fujiwara et al. ............ | 348/416 |
| 5,933,536 A | * | 8/1999 | Fukuzawa .................... | 382/246 |
| 6,088,061 A | * | 7/2000 | Katata et al. ................ | 348/390 |

FOREIGN PATENT DOCUMENTS

EP         0705041 A2  *  9/1995     ............ H04N/7/36

OTHER PUBLICATIONS

Ultimedia Services Version 2 for AIX: Programmer's Guide and Reference, http://www.rs6000.ibm.com/doc_link/en_US/adoc_lib/ultimdia/ultimdia/ultiprgd/H_263.htm pulled Apr. 21, 1998.
"Video Codec Test Model, TMN5", http:/www.crl.dec.com/personal/dufaux/itu_doc/tmn5.ps, pulled Jan. 31, 1995.
Rijkse et al., "Video Coding for Low Bitrate Communication" Internations Telecommunication Union Draft H.263, 1995.
Dufaux et al., "Motion Estimation Techniques for Digital TV: A Review and a New Contribution", Proceedings of the IEEE, vol. 83, No. 6, pp 858–876, 1995.

* cited by examiner

*Primary Examiner*—Vu Le
(74) *Attorney, Agent, or Firm*—Hamilton, Brook, Smith & Reynolds, P.C.

(57) ABSTRACT

A method and apparatus is described for encoding a video sequence of frames. Each frame in the video sequence is organized in blocks of pixels. A scene change is detected when a current frame in the video sequence is substantially different from a previous frame. When it is determined that the current frame is the change in scene, the current frame is coded to be an intra frame with each block of pixels of the intra frame is being an intra-coded block. Coding the sequence of frames produces a compressed bit stream having a coded intra frame at each scene change. Each coded intra frame provides an access point in the bit stream from which a storyboard of the scenes in the video sequence can be generated.

8 Claims, 2 Drawing Sheets

CODING AN INTRA-FRAME UPON DETECTING A SCENE CHANGE IN A VIDEO SEQUENCE

FIELD OF THE INVENTION

The present invention relates to the field of video coding systems, and, more particularly, to a system and method for coding frames upon detecting a scene change in a video sequence.

BACKGROUND

Normally, successive frames in a video sequence are very similar to each other. Most sequences have scenes in which an object moves across a stationary background, or a background moves behind a stationary object. Consequently, many regions in one frame often appear in the next frame, only displaced to a different position in that subsequent frame. Video coding systems, then, take advantage of such redundancy within the frames by using predictive coding techniques, such as motion estimation and motion compensation, to reduce the volume of data for compressing the frames.

At a scene change, however, successive frames are significantly different from each other, causing motion estimation and motion compensation techniques to fail. The scene change leads to substantial prediction errors and annoying quantization artifacts, particularly at low bit rates.

To avoid such artifacts, then, a technique is needed that not only detects scene changes, but also make advantageous use of the scene change during the encoding of the frames to produce a video having high subjective visual quality when displayed.

SUMMARY OF THE INVENTION

The present invention relates to a computerized method and a system for encoding a sequence of video frames. Each frame is organized in blocks of pixels, typically called macroblocks. In terms of the method, the invention determines that a current frame in the sequence of video frames is a change in scene from a previous frame. When it is determined that the current frame is a scene change, the current frame is coded to be an intra frame with each block of pixels of the intra frame being an intra-coded block.

In one aspect, the method determines a coding mode for each block of pixels in the current frame, counts a number of the blocks of pixels of the current frame for which the coding mode is determined to be a particular mode, and compares the number to a predetermined threshold to determine whether the scene change has occurred.

In another aspect of the method, the scene detecting and coding is repeated for each frame in the video sequence to produce a compressed bit stream having a coded intra frame at each scene change. Each coded intra frame provides an access point in the bit stream from which a storyboard of scenes in the video sequence can be generated.

In terms of the system, the invention includes a scene change detector for determining whether a current frame in the sequence of video frames is a scene change from a previous frame, and an encoder for coding the current frame to be an intra frame when the scene change detector determines that the current frame is the scene change.

BRIEF DESCRIPTION OF THE DRAWING

An embodiment of the invention will be described with reference to the accompanying drawings, in which.

DETAILED DESCRIPTION OF PREFERRED EMBODIMENTS

Figure 1:
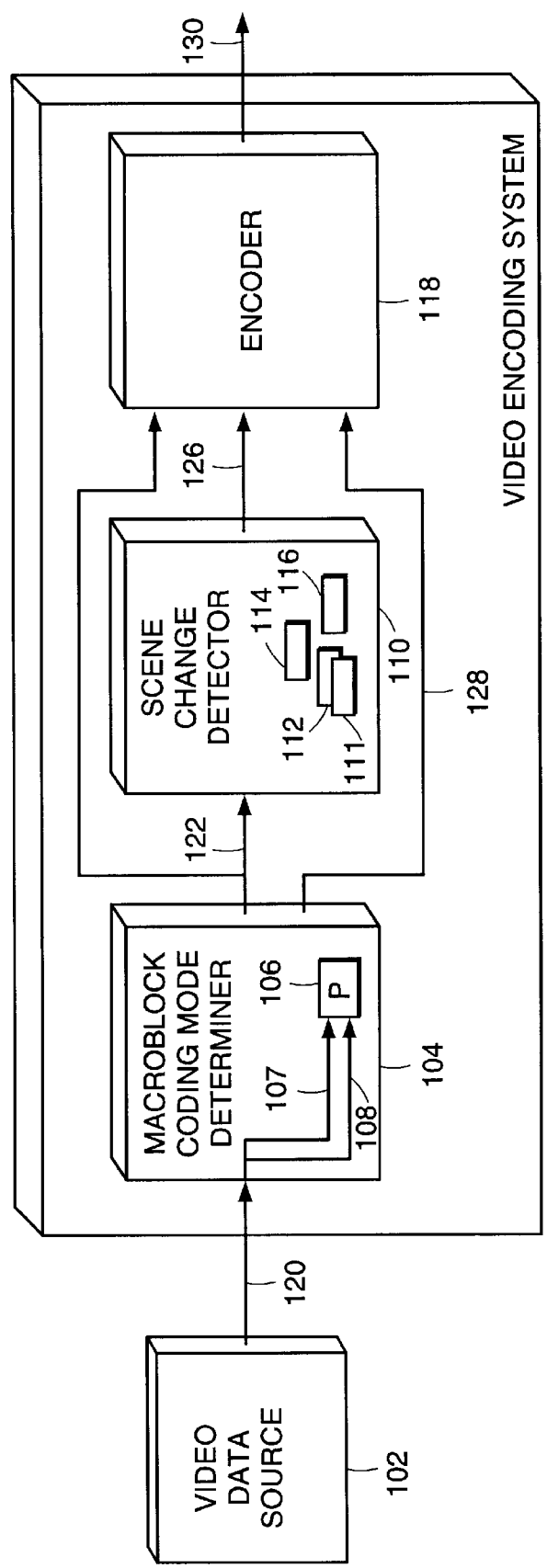
FIG. 1 is a block diagram of a video encoding system embodying the principles of the invention.

FIG. 1 shows an exemplary embodiment of a low bit rate, video encoding system 100 that is used in video applications to encode video signals according to the principles of the invention. In general, video applications can use the video encoding system 100 to encode and store compressed video data for subsequent delivery, decoding, and display when a viewer so prefers. In practice, the video encoding system 100 is more suited for non-real-time video applications (e.g., one-way video communication) than for real-time applications (e.g., two-way interactive video communication), but both types of video applications can practice the principles of the invention.

In brief overview, the video encoding system 100 includes a macroblock coding mode determiner 104, a scene change detector 110, and an encoder 118. A video data source 102 supplies the video encoding system 100 with video images (i.e., pictures or frames) to be compressed.

In more detail, the video data source 102 is any source capable of supplying video signals 120 (i.e., a sequence of frames) to the video encoding system 100 for compression. The video data source 102 can be a video input device, such as a video camera, or video data obtained from a computer file system. The frames 120 are in a preprocessed format that can be readily compressed by the video encoding system 100.

Each of the frames 120 is divided into macroblocks, which are blocks of pixels. For a color frame, each MB includes a 16×16 block of luminance pixels and two 8×8 blocks of chrominance pixels, and completely describes a 16×16 color segment of a frame. In a MB, a 16×16 block of luminance pixels are further subdivided into four luminance blocks of 8×8 pixels.

The macroblock coding mode determiner 104 is in communication with the video data source 102 to receive the sequence of frames 120, and with the scene change detector 110 and the encoder 118 via signal line 122. The coding mode determiner 104 includes a prediction unit 106 that determines the coding mode for each MB of the current frame. By signal line 122, the determiner 104 provides the coding mode determined by the prediction unit 106 for each MB.

To determine the coding mode for a MB, the prediction unit 106 employs standard motion estimation and motion compensation techniques using a current frame 107 and a previous frame 108 (from the frames 120). The current frame 107 is the frame that is currently being analyzed by the system 100 for detecting a scene change, and the previous frame 108 is the frame last coded by the system 100 prior to the current frame 108. The actual motion compensation technique used by the prediction unit 106 depends on the particular standard being implemented (e.g., ITU-T H.263). The prediction unit 106 can use one of a variety of the motion estimation techniques described in Dufaux and Moscheni's "Motion Estimation Techniques for Digital TV: A Review and New Contribution", Proceedings of the IEEE, Vol. 83, No. 6, pp. 858–876, June 1995, incorporated by reference herein.

Macroblocks can be coded in one of two categories of modes: intra mode and predictive mode (also called inter mode). The category of predictive mode includes the INTER8 and INTER16 coding modes as defined by the MPEG-4 and H.263 standards. A MB that is coded in the intra mode is called an intra-coded macroblock and in the predictive mode is called an inter-coded macroblock. In the intra mode, the MB is coded independently of pixel data in previous or future frames. In the predictive mode, the MB is coded with reference to pixel data in a previous frame, a future frame, or both. A prediction is formed by applying motion compensation techniques to the referenced frames, and MB error data are generated by subtracting the prediction from the original pixel data.

The scene change detector 110 includes counters 111, 112, a register 114, and circuitry 116 in communication with the counters 111, 112 and the register 114 for determining whether the current frame is substantially different from the previous frame, and consequently represents a scene change. Generally, a large number of intra MBs in a frame is an indicator that a scene change has occurred. The counter 111, called numberOfINTRA, counts of the number of MBs that the determiner 104 designates for intra mode coding. The counter 112, called numberOfINTER, counts the number of MBs that are designated for predictive mode coding.

The register 114 stores a threshold value used by the scene change detector 110 to determine whether the current frame is a scene change. The threshold value, T, is between 0 and 1. A preferred threshold value is approximately 0.30, but other values can be used satisfactorily. Multiplying the threshold value, T, by the number of MBs in the current frame (i.e., numberOfINTRA+numberOfINTER) produces a threshold number of MBs needed for detecting a scene change. In one embodiment, the threshold number represents the number of intra mode MBs in the current frame required for the current frame to be a scene change. Clearly, other criteria can be used to determine whether the current frame is a scene change.

The circuitry 116 is coupled to receive the values stored in the counters 111, 112 and the register 114. The operation of the circuitry 116 is to compute the threshold number from the counts in the counters 111, 112 and register 114, to compare the number of intra mode MBs in the current frame to the threshold number, and to produce a signal 126 indicating whether a scene change has been detected. Various circuits that are known in the art can be used to implement such operation.

The encoder 118 is in communication with the scene change detector 110 via signal 126, with the macroblock coding mode determiner 104 via signal 122, and with the video data source 102 via signal 128. By signal line 128, the encoder 118 obtains pixel data corresponding to a particular MB of the current frame. Preferably, the encoder 118 uses a hybrid motion compensated transform video coding scheme. Examples of such a video coding scheme include ISO MPEG-1 and MPEG-2, and ITU-T H.261 and H.263. Such encoders are based on a Variable Length Code (VLC), which produces a highly compressed bit stream 130 representing the frames 120 and having a variable bit rate.

General Operation

During operation, the video encoding system 100 of the invention receives a sequence of frames 120 from the video data source 102. According to the principles of the invention, the video encoding system 100 determines whether to code each frame as an intra-frame (I-frame) or a predictive frame (P-frame). Typically, the coding type of each frame is included in the header information for that frame.

By definition, all MBs of an I-frame are coded in the intra mode. In a P-frame, the MBs are coded in a mixture of intra mode and predictive mode. Conceivably, all MBs of a P-frame may be intra-coded macroblocks like the MBs of an I-frame. But although all MBs are intra-coded, such a frame is still a P-frame and not an I-frame.

For each frame, the video encoding system 100 determines for each MB of that frame whether that MB should be coded in intra mode or predictive mode. A frame that has a large number of intra mode MBs indicates that motion compensation has failed and, therefore, that frame is significantly different from the previous coded frame. The scene change detector 110 infers a scene change from the large number, and sets the frame type to intra, that is, the frame and all of the MBs in the frame are designated for intra coding. The encoder 118 codes the current frame as an I-frame, that is, all MBs of the frame are intra-coded and the header information of the frame is changed, if necessary, to reflect that the frame is an I-frame. Coding the sequence of frames, therefore, produces the compressed bitstream 130 having a coded intra frame at each scene change.

Generally, only I-frames can be randomly accessed. Thus, an advantage of inserting intra-coded frames in the compressed sequence of frames is that these frames can now be randomly accessed. As a result, a storyboard consisting of the scenes of the video sequence can be readily produced.

Inserting I-frames, which resets the motion compensated loop, prevents the propagation of quantization artifacts from one scene to the next. The propagation of a color from one scene into a following scene that does not have that color is an example of such an artifact. Such artifacts are noticeable to the human eye and annoying. Thus, another advantage of the invention is to improve the subjective visual quality of the video when the bitstream 130 is decoded and displayed.

Figure 2:
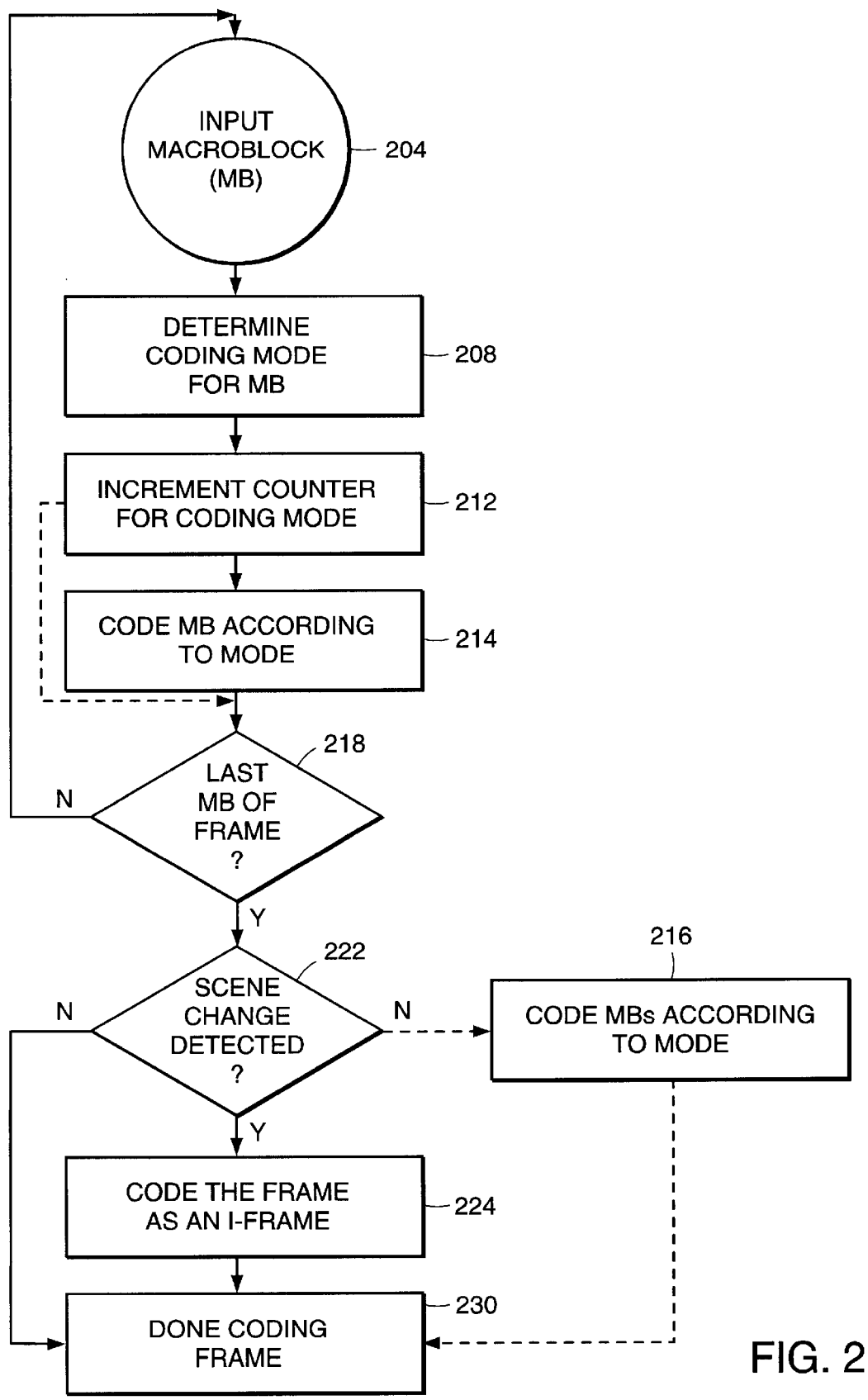
FIG. 2 is a flow chart of a process of the invention.

FIG. 2 shows in more detail an exemplary process 200 of the invention for coding an intra frame into a sequence of video frames upon detecting a scene change. A MB of the current frame is input to the macroblock coding mode determiner 104 (step 204). At step 208, the coding mode determiner 104 indicates the coding mode for the MB.

Determining the Macroblock Coding Mode

In more detail, the decision as to the mode of the MB can be based, for example, on the H.263 test model or the MPEG-4 verification Model. The H.263 test model is described in "Video Codec Test Model, TMN5", by Telnor Research, January, 1995; the MPEG-4 verification model, in ISO-IEC JTC1/SC29/WG11, "MPEG-4 Verification Model", 1998, both incorporated by reference herein.

For each MB, the macroblock coding mode determiner 104 determines to encode the MB as INTRA or INTER (INTER includes both INTER16 and INTER8). To make this determination, the determiner 104 computes the following parameters, in which the symbol original(i,j) represents the current frame, and MC(i,j, x, y) represents the motion compensated MB using the motion vector (x, y):

$$\text{MB\_mean} = \left( \sum_{i=1, j=1}^{16,16} original(i, j) \right) \bigg/ 256; \quad 1)$$

$$A = \sum_{i=1, j=1}^{16,16} |original(i, j) - \text{MB\_mean}|; \quad 2)$$

$$SAD_{16}(x, y) = \sum_{i=1, j=1}^{16,16} |original(i, j) - MC(i, j, x, y)|, \quad 3)$$

for x, y in the maximum displacement range (e.g., +−15 for H.263).

The (x, y) pair resulting in the lowest $SAD_{16}$ value is selected as the motion vector for the MB. If the motion vector of the MB is the zero vector, i.e., (0,0), then $SAD_{16}$ is further reduced by 100, that is, $SAD_{16}(0,0)=SAD_{16}(0,0)-100$, to favor the selection of the zero vector when there is no significant difference.

When the video encoding system 100 permits advanced prediction, i.e., one motion vector for each of the four 8×8 blocks in the MB, then the following additional parameters can be computed:

$$SAD_8(x, y) = \sum_{k=1}^{4} \sum_{i=1,j=1}^{8,8} |original(i, j) - MC_k(i, j, x, y)|, \text{ and} \quad 4)$$

$$SAD_{inter}=\min(SAD_{16}, SAD_8). \quad 5)$$

The coding mode of the MB is then determined as indicated by the following pseudo-code:
if (A<($SAD_{inter}$–500))
  then
    the coding mode for the MB is intra mode;
  else
    the coding mode for the MB is inter mode;
endif Via signal 122, the macroblock coding mode determiner 104 provides the scene change detector 110 with the coding mode determined for the MB. The counter corresponding to that determined type is incremented. If intra mode is the determined mode, then, at step 212, the scene change detector 110 increments the numberOfINTRA counter 111. If not, then the scene change detector 110 increments the numberOfINTER counter 112.

When the last MB of the current frame is analyzed (step 218), the scene change detector 110 determines whether a scene change has occurred from the values stored in the numberOfINTRA and numberOfINTER counters 111, 112 (step 222).

Detecting a Scene Change

In more detail, the scene change detector 110 can determine that it has detected a scene change when, for example, the number of intra MBs exceeds a percentage of the total number of MBs in the frame, as the following pseudo-code illustrates:
  if numberOfINTRA>T*(numberOfINTRA+numberOfINTER)
    then the current frame is a scene change,
where parameter T is the above-mentioned predetermined threshold value between [0, 1]. The above scene change detection technique is merely illustrative, for the principles of the invention can be practiced with any alternative method capable of detecting a scene change.

Coding the Frame

If the current frame is determined to be a scene change, then the encoder 118 codes the current frame as an I-frame, in which all MBs of that frame are intra-coded. Otherwise, the frame is inter-coded, that is, each MB is coded according to the coding mode determined for that MB by the determiner 104 in step 208.

In one embodiment of the invention, the MB can be coded at the time the coding mode is determined (step 214). After the last MB is analyzed, if the scene change detector 110 determines that the current frame is not a scene change, then the coding of the frame is complete (step 230). If the current frame is later determined to be scene change, then those MBs that were coded in a mode other than in intra mode (e.g., inter coded) are re-coded in intra mode at step 224. Non-real-time applications are amenable to the re-coding of MBs because such applications lack a time constraint in which to compress the video sequence.

In an alternative embodiment, the coding of each MB is deferred until after the scene change detector 110 has determined whether the current frame is a scene change. If the current frame is a scene change, then the encoder 118 codes all MBs of the current frame as intra-coded macroblocks (step 224). Otherwise, the frame is inter-coded at step 216 with each MB being coded according to the coding mode determined for that MB by the determiner 104 in step 208.

Although described in the context of particular embodiments, one skilled in the art will recognize that the invention can enable many new products in the field of low bit rate video delivery, such as, for example, video codec products and multimedia indexing products. It will be apparent, therefore, that variations and modifications may be made to the described embodiments, with the attainment of all or some of the advantages. It is the object of the appended claims, therefore, to cover all such variations and modifications as come within the spirit and scope of the invention.

We claim:

1. A computerized method for encoding a sequence of video frames, each frame being organized in blocks of pixels, the method comprising the steps of:
   determining whether a current frame in the sequence of video frames is a change in scene from a previous frame;
   coding the current frame to be an intra frame with each block of pixels of the intra frame being an intra-coded block when it is determined that the current frame is the change in scene;
   determining a coding mode for each block of pixels in the current frame;
   coding each block of pixels when the coding mode for that block is determined; and
   re-coding each block of pixels of the current frame that was previously coded in a different coding mode other than intra mode when it is determined that the current frame is the change in scene from the previous frame.

2. The computerized method of claim 1, further comprising the steps of:
   counting a number of the blocks of pixels of the current frame for which the coding mode is determined to be a particular mode; and
   comparing the number to a predetermined threshold to determine whether the scene change has occurred.

3. The computerized method of claim 2, wherein the scene change has occurred when the particular mode is intra mode and the counted number of blocks exceeds the predetermined threshold.

4. The computerized method of claim 1, further comprising the step of:
   repeating the steps of determining and coding for each frame in the video sequence to produce a compressed bit stream having a coded intra frame at each scene change, each coded intra frame providing an access point in the bit stream from which a storyboard of scenes in the video sequence can be generated.

5. A video encoding system for coding a sequence of video frames, comprising:
   a scene change detector for determining whether a current frame in the sequence of video frames is a change in scene from a previous frame;
   an encoder coupled to the scene change detector for coding the current frame to be an intra frame having all blocks of pixels coded to be intra-coded blocks when the scene change detector determines that the current frame is the change in scene; and a coding mode determiner, coupled to the scene change detector, which determines a coding mode for each block of pixels in the current frame; and wherein the encoder codes each block of pixels according to the coding mode determined for that block and subsequently re-codes each block of pixels that was previously coded according to a different coding mode other than intra mode when the scene change detector determines that the current frame is a scene change.

6. The system of claim 5, further comprising:

a counter coupled to the coding mode determiner which counts a number of the blocks of pixels of the current frame for which the coding mode is determined to be a particular mode; and circuitry coupled to the counter which determines from the counted number whether the scene change has occurred.

7. A video encoding system for coding a sequence of video frames, comprising:

a scene change detector which determines whether a current frame in the sequence of video frames is a change in scene from a previous frame;

means for encoding coupled to the scene change detector for coding the current frame to be an intra frame having all blocks of pixels coded to be intra-coded blocks when the scene change detector determines that the current frame is the change in scene; and coding mode determiner means, coupled to the scene change detector, for determining a coding mode for each block of pixels in the current frame; and wherein the means for encoding codes each block of pixels according to the coding mode determined for that block and subsequently re-codes each block of pixels that was previously coded according to a different coding mode other than intra mode when the scene change detector determines that the current frame is a scene change.

8. The system of claim 7, further comprising:

means for counting coupled to the coding mode determiner means for counting a number of the blocks of pixels of the current frame for which the coding mode is determined to be a particular mode; and scene change means coupled to the means for counting for determining from the counted number whether the scene change has occurred.

\* \* \* \* \*